United States Patent
Hilden

(10) Patent No.: US 10,767,783 B2
(45) Date of Patent: Sep. 8, 2020

(54) METHOD FOR ACTUATING A VALVE

(71) Applicant: Robert Bosch GmbH, Stuttgart (DE)

(72) Inventor: Michael Hilden, Obersulm-Eschenau (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/973,895

(22) Filed: May 8, 2018

(65) Prior Publication Data
US 2018/0320797 A1 Nov. 8, 2018

(30) Foreign Application Priority Data
May 8, 2017 (DE) .................. 10 2017 207 705

(51) Int. Cl.
| | | |
|---|---|---|
| *F16K 31/06* | (2006.01) | |
| *B60T 13/66* | (2006.01) | |
| *B60T 8/36* | (2006.01) | |
| *H01F 7/18* | (2006.01) | |
| *B60T 13/68* | (2006.01) | |

(52) U.S. Cl.
CPC ............ *F16K 31/0675* (2013.01); *B60T 8/36* (2013.01); *B60T 13/662* (2013.01); *H01F 7/18* (2013.01); *B60T 13/68* (2013.01); *H01F 2007/1888* (2013.01); *H01F 2007/1894* (2013.01)

(58) Field of Classification Search
None
See application file for complete search history.

(56) References Cited

U.S. PATENT DOCUMENTS

| | | | |
|---|---|---|---|
| 2009/0078799 A1* | 3/2009 | Achleitner | F02D 41/20 239/585.5 |
| 2015/0300522 A1* | 10/2015 | Ito | H01F 7/1844 361/170 |
| 2017/0125145 A1 | 5/2017 | Pecori et al. | |
| 2018/0094742 A1* | 4/2018 | Tolentino | F16K 31/0655 |

FOREIGN PATENT DOCUMENTS

| | | |
|---|---|---|
| DE | 4029620 C2 | 4/1995 |
| DE | 102011075270 A1 | 11/2012 |

* cited by examiner

*Primary Examiner* — Daphne M Barry
(74) *Attorney, Agent, or Firm* — Maginot, Moore & Beck LLP

(57) ABSTRACT

A method for actuating a valve with a magnetic valve drive, through which electric current is passed to open the valve, to close the valve, and to hold the valve in an open or closed position, includes receiving an opening signal. The method further includes varying the electric current that is passed through the valve drive as a first current signal to open the valve in response to the received opening signal. The method further includes receiving a closing signal and varying the electric current that is passed through the valve drive as a second current signal for closing the valve in response to the received closing signal. The second current signal has at least two variations of the electric current at separate times.

8 Claims, 1 Drawing Sheet

METHOD FOR ACTUATING A VALVE

This application claims priority under 35 U.S.C. § 119 to patent application no. DE 10 2017 207 705.0, filed on May 8, 2017 in Germany, the disclosure of which is incorporated herein by reference in its entirety.

The disclosure concerns a method for actuating a valve with a magnetic valve drive, through which electric current is passed to open the valve, to close the valve and to hold the valve in an open or closed position. The disclosure can in particular be used for the electrical actuation of inlet valves of for example ABS, TCS, ESP and/or IPB systems. In this case, the abbreviations stand for: ABS for Anti-lock Braking System, TCS for Traction Control System (drive slip control), ESP for Electronic Stability Program and IPB for Integrated Power Brake.

BACKGROUND

Inlet valves of an ABS or ESP system are typically operated either in a so-called switching mode or in a so-called (pressure difference) setting mode. In this case, the switching mode is characterized by brief full strokes and the (pressure difference) setting mode by volumetric flow-dependent partial strokes.

In the switching mode, the inlet valve opens fully and enables the maximum possible flow through the valve, which essentially depends on the pressure difference arising across the valve. The switching mode is robust in terms of the reproducibility thereof, in particular against fluctuating boundary conditions, and is highly dynamic and typically only very short-term, in particular being active for a few milliseconds or for the selected operating mode.

In the (pressure difference) setting mode, the inlet valve only opens in partial strokes according to the selection of the electric current, and as a result enables significantly smaller flows, i.e. volumetric flows. In the setting mode, typically pressure difference-dependent and regularly also valve-specific deviations occur between the actual and target values. In specific driving situations, said deviations can be greater than in the switching mode.

Therefore, the switching mode for inlet valves for driving safety systems has become established for such special driving situations, whereas in many other application areas, in particular on snow and ice, the (pressure difference) setting mode is used. One disadvantage of the switching mode however, is that in the switching mode comparatively loud valve closure noise arises, which is due to the so-called "water hammer" when suddenly decelerating the accelerated column of fluid. If fluids with high elasticity are used in connection with driving safety systems, then said (noise) problem increases further, because in this case large throughflows or large volumetric flows pass through the valve and must be controlled by the valve.

An (idealized) example of a flow profile, with which the valve can be actuated in the switching mode, is shown schematically in FIG. 1 together with an (idealized) valve position profile, which is set because of the actuation of the valve with the same current profile. The current profile 4 is shown in the upper part of FIG. 1 and the associated valve position profile 5 is shown in the lower part of FIG. 1. Using the profile of the valve position 7, it can be seen that the valve is operated only with full strokes 8 in the switching mode. But when closing the valve this results in a sudden deceleration of the accelerated column of fluid and so-called "water hammer" occurs, resulting in increased noise generation. The decisive position of the valve position profile 5 is highlighted in FIG. 1 with an elliptical border.

SUMMARY

A method is proposed here for actuating a (solenoid) valve with a magnetic valve drive according to the disclosure, through which electric current is passed to open the valve, to close the valve and to hold the valve in an open or closed position, comprising at least the following steps:
 a) receiving an opening signal
 b) varying the electric current that is passed through the valve drive in the manner of a first current signal to open the valve in response to the received opening signal
 c) receiving a closing signal, and
 d) varying the electric current that is passed through the valve drive in the manner of a second current signal to close the valve in response to the received closing signal, wherein the second current signal comprises at least two variations of the electric current at separate times.

The indicated sequence of the steps a), b) and c) of the method arises in the case of normal progress of the method. The method contributes in particular to reducing a closing noise of the valve or the noise generation when closing the valve. This is in particular achieved by briefly interrupting a valve closing movement at the end thereof, possibly even multiple times owing to the configuration of the second current signal, so that the stroke of the valve is not closed suddenly, which constitutes a hard interruption of the fluid motion. Rather, owing to the configuration of the second current signal, a valve closure body, in particular a tappet, can be slowly closed in small partial strokes, which decelerates the column of fluid gently.

In step a), at the start of the process a (valve) opening signal is received and/or detected. The opening signal can be sent by a higher-level controller or regulator, for example a driving safety system of a motor vehicle, to an electronic control unit that determines the electric current that is to be passed by the magnetic valve drive and that is associated with the valve. The electronic control unit associated with the valve usually comprises means to detect and analyze the opening signal.

In step b), variation of the electric current that is passed through the valve drive is carried out in the manner of a first current signal, in particular to bring about full opening of the valve in response to the received opening signal. The first current signal is preferably in the form of a square wave signal (in idealized form). Furthermore, the first current signal (in idealized form) is preferably in the form of a pulse. The first current signal preferably comprises a steady current profile (starting from a closing current) until reaching an opening current, in particular a steadily decreasing current level.

In step c), a closing signal is received. The closing signal can be sent by a higher-level controller or regulator, for example a driving safety system of a motor vehicle, to an electronic control unit that determines the electric current to be passed through the magnetic valve drive and that is associated with the valve. The electronic control unit that is associated with the valve routinely comprises means for detecting and analyzing the closing signal.

In step d), a variation of the electric current that is passed through the valve drive is carried out in the manner of a second current signal in order to bring about an especially full closure of the valve in response to the received closing signal. The second current signal (in idealized form) preferably comprises the form of an especially rising staircase.

Furthermore, the second current signal preferably has an uneven current profile (starting from an opening current) until reaching a closing current, in particular an unevenly increasing profile, for example.

In the sense of the method proposed here, the second current signal comprises at least two variations of the electric current at separate times. The second current signal preferably comprises at least three or even at least four variations of the electric current at separate times. Particularly preferably, the variations at separate times are increases or pulses of the electric current at separate times.

According to an advantageous embodiment, it is proposed that the valve is at least partly closed if a (certain) electric current is flowing through the valve drive and is open if no electric current is flowing through the valve drive. The valve is preferably fully closed if a (certain) closing current is flowing through the valve drive. More preferably, the valve is fully open if no current (i.e. for example zero) is flowing through the valve drive. In other words, in particular this means that the valve is a normally open (solenoid) valve.

According to one advantageous embodiment, it is proposed that the valve is energized for closing in such a way that it is closed with three mutually adjacent partial strokes. For this purpose, it is particularly preferable if the valve is energized for closing with a second current signal comprising three variations at separate times, in particular three increases of the electric current at separate times. In this case, the partial strokes can all have the same stroke or different strokes, in particular having strokes that reduce from partial stroke to partial stroke. The term "stroke" means a distance traversed by a valve component, for example a valve closure body that can be moved by the valve drive.

According to one advantageous embodiment, it is proposed that the second current signal (in idealized form) has at least two variations of the electric current in the form of successive steps of an especially rising staircase. The second current signal preferably has at least two, at least three or even at least four successive steps of an especially rising (current) staircase.

It is particularly preferable if the steps of the staircase each have a current level. In particular, the steps of the staircase each have a defined and/or constant current level. The term "current level" denotes an electric current of the same and/or constant current value in this connection. It is particularly advantageous if the current level of a later step in time is higher than the current level of a preceding step in time. Furthermore, according to the second current profile, the electric current preferably dwells at two different current levels lying between the closing current and an opening current before reaching a closing current, wherein the later of the two current levels is higher than the other (earlier) current level.

According to a further advantageous embodiment, it is proposed that the second current signal has at least two variations of the electric current in the form of successive pulses. The second current signal preferably comprises at least three or even at least four successive pulses. In this connection, the term "pulse" denotes a brief increase of the current level, immediately followed again by a reduction of the current level. It is particularly preferable if the electric current decrease to zero again between the pulses.

According to one advantageous embodiment, is proposed that the valve is operated in a switching mode during step b) that is characterized in that the valve is (always) operated with full strokes. Alternatively or cumulatively, it is proposed that the valve is operated during step d) in a setting mode that is characterized in that the valve is operated with volumetric flow-dependent partial strokes. The valve is preferably operated in the switching mode during steps a), b) and c). Furthermore, the valve is preferably operated in the setting mode only during step d). The second current profile is preferably designed in such a way that (for closing a normally open valve) it is not returned (directly) back to full energization at the end of the switching mode or a switching mode pulse, but a setting mode or at least two setting mode periods is or are appended for a short time.

It is preferable if the second current profile is designed such that the closing noise of the valve is reduced significantly compared to a pure switching mode, in particular by a factor of 1.5 to 5. This can for example be detected hydraulically from the fact that the local pressure oscillation amplitudes during closing are reduced compared to the pure switching mode by a factor of 1.5 to 5.

The method is particularly advantageous if the valve is an inlet valve of a technical driving safety system of a motor vehicle. The technical driving safety system can be for example an ABS system, a TCS system, an ESP system and/or an IPB system. The technical driving safety system is preferably a TCS system. The introductory comments are fully referenced in relation to the description of the abbreviations.

A computer program that is arranged to carry out the steps of the method proposed here and a machine-readable memory medium on which said computer program is stored will also be described here. An electronic control unit, which is preferably disposed in a motor vehicle or is provided for mounting in a motor vehicle, can be used as a device for carrying out the described method. The control unit accesses the computer program for example in order to carry out the method.

The details, features and advantageous embodiments discussed in connection with the method presented here can accordingly also arise with the computer program, the memory medium and/or the device and vice versa. In this respect, full reference is made to the statements there for detailed characterization of the features.

BRIEF DESCRIPTION OF THE DRAWINGS

The solution proposed here and the technical environment thereof are described in detail below using the figures. It should be noted that the disclosure shall not be limited by exemplary embodiments. In particular, it is also possible, if not explicitly shown otherwise, to extract partial aspects of the matters shown in the figures and to combine the same with other components and/or findings from other figures and/or the present description. In the figures.

DETAILED DESCRIPTION

Figure 1:
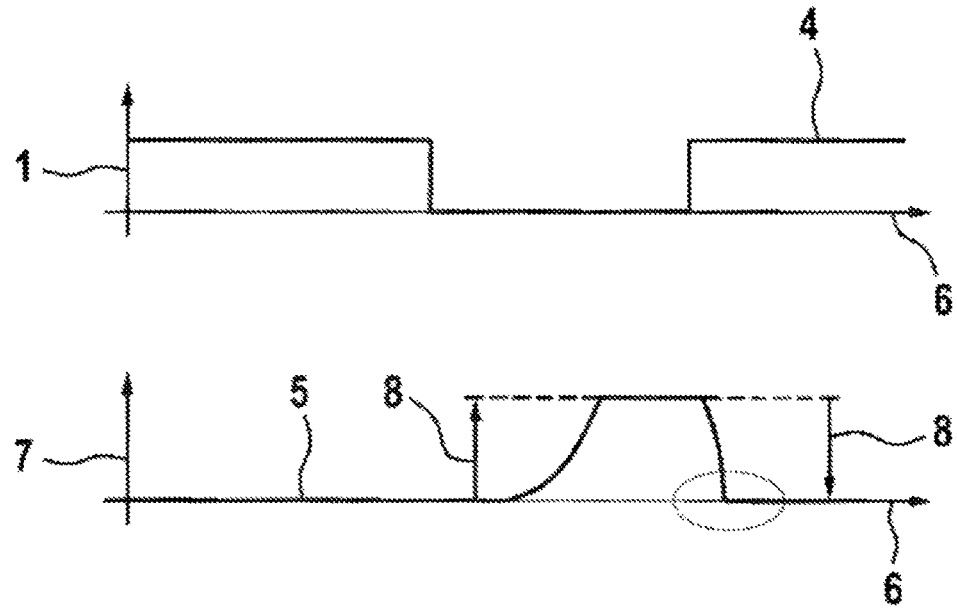
FIG. 1: shows schematically a (target) current profile with an associated valve position profile according to the prior art.

FIG. 1 shows schematically an (idealized) current profile 4 with an associated (idealized) valve position profile 5 according to the prior art. According to the illustration of FIG. 1, the profile of the electric current 1 against time 6 is plotted at the top and the profile of the valve position 7 against time 6 is plotted at the bottom. Regarding the profile of the valve position 7, it should be mentioned that the valve is fully closed at the level of the abscissa. For a further description of the current profile 4 and the valve position profile 5 in FIG. 1, refer to the above statements about the prior art.

Figure 2:
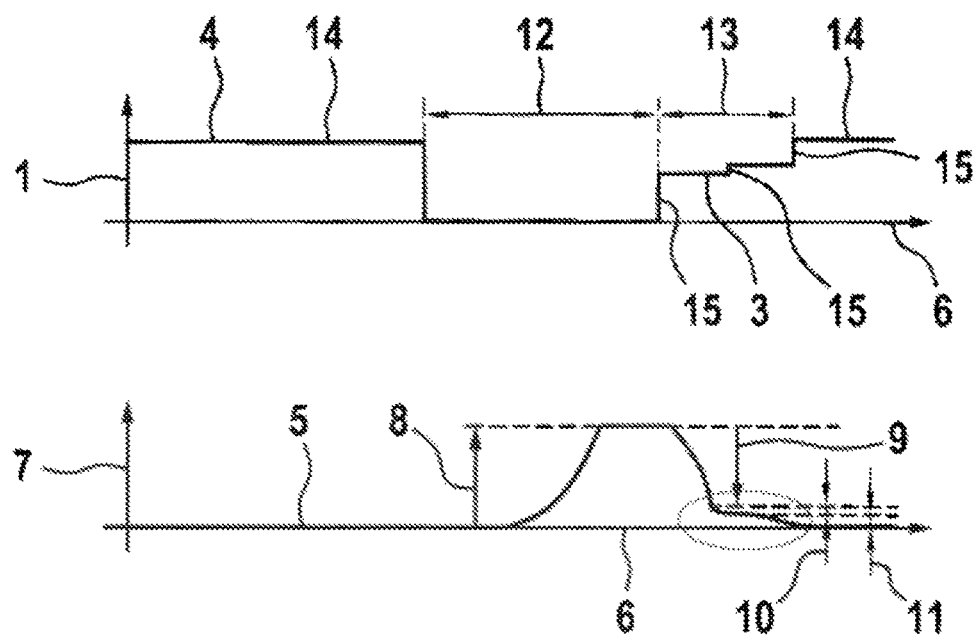
FIG. 2: shows schematically a (target) current profile with an associated valve position profile, which are produced with a method according to the disclosure.

FIG. 2 shows schematically an (idealized) current profile 4 with an associated (idealized) valve position profile 5, which are produced with a method according to the disclosure. Also, according to the illustration of FIG. 2, the profile of the electric current 1 against time 6 is plotted at the top and the profile of the valve position 7 against time 6 is plotted at the bottom. Regarding the profile of the valve position 7, it should also be mentioned here that the valve is fully closed at the level of the abscissa.

At the start of the current profile 4 shown in FIG. 2, the valve (not shown here), which here by way of example is a normally open solenoid valve, is energized with a closing current 14 that is dimensioned so that the valve is fully closed. After receiving an opening signal (not shown here), the electric current 1 that is passed through the valve drive (not shown here) to open the valve is varied in the manner of a first current signal 2. The first current signal 2 has the form of a square wave signal here, by way of example and idealized, with which the electric current 1 is suddenly reduced to zero to open the valve.

The variation of the electric current 1 in the manner of the first current signal 2 results in a full stroke 8 according to the associated valve position profile 5, by which the maximum flow cross-section of the valve is opened because the valve is fully opened. During an opening time 12 following the reception of the opening signal, the valve continues to be actuated or energized with the first current signal 2, wherein in the case represented by way of example and in an idealized manner in FIG. 2, exactly zero electric current 1 is passed through the valve drive during the (entire) opening time 12.

The valve is actuated with the first current signal 2 until a closing signal (not shown here) is received. After receiving the closing signal, the electric current 1 that is passed though the valve drive for closing the valve is altered in the manner of a second current signal 3. With the method presented here, the second current signal 3 comprises at least two variations 15 of the electric current 1 at separate times. According to the example shown in FIG. 2, the second current signal 3 comprises three variations 15 of the electric current 1 at separate times, wherein with the third variation 15 the closing current 14 with which the valve is fully closed is achieved again. There is a closing time 13 between receiving the closing signal and reaching the closing current 14.

The variations 15 at separate times of the electric current 1 according to the second current signal 3 are shown here by way of example in the form of successive steps of a staircase, wherein the steps of the staircase each have a defined current level. In order to bring about a closing movement of the valve, in this case the current level of a later step of the staircase is higher than the current level of an earlier step of the staircase.

According to the associated valve position profile 5, the variation of the electric current 1 in the manner of the second current signal 3 results in the valve being closed with three adjacent partial strokes, namely a first partial stroke 9, a second partial stroke 10 and a third partial stroke 11.

According to the illustration of FIG. 2, the valve is operated in a switching mode during the opening time 12 that is characterized in that the valve is opened exclusively with full strokes, here with one full stroke 8. During the closing time 13, the valve is operated in a setting mode that is characterized in that the valve is operated with volumetric flow-dependent partial strokes, here being closed with the partial strokes 9, 10 and 11.

The method contributes in particular to reducing a closing noise of the valve or the noise generation when closing the valve.

What is claimed is:

1. A method for actuating a valve with a magnetic valve drive, through which electric current is passed to open the valve, to close the valve, and to hold the valve in an open or closed position, comprising:
   receiving an opening signal;
   varying the electric current that is passed through the valve drive as a first current signal to open the valve in response to the received opening signal;
   receiving a closing signal; and
   varying the electric current that is passed through the valve drive as a second current signal for closing the valve in response to the received closing signal,
   wherein the second current signal has at least two variations of the electric current at separate times, a first of the at least two variations causing the valve to partly close, and a second of the at least two variations causing the valve to fully close,
   wherein the at least two variations of the electric current at separate times are in the form of successive pulses at the separate times and a value of the electric current is reduced to zero between the successive pulses.

2. The method according to claim 1, further comprising:
   operating the valve to partly close if the electric current is flowing through the valve drive; and
   operating the valve to open if no electric current is flowing through the valve drive.

3. The method according to claim 1, further comprising: energizing the valve for closing such that it is closed with three mutually adjoining partial strokes.

4. The method according to claim 1, wherein the at least two variations of the electric current at separate times are in the form of successive steps of a staircase.

5. The method according to claim 4, wherein the steps of the staircase each have a current level.

6. The method according to claim 1, further comprising: operating the valve as at least one of:
   (1) full strokes in a switching mode during the variation of the electric current as the first signal, and
   (2) volumetric flow-dependent partial strokes in a setting mode during the variation of the electric current as the second signal.

7. The method according to claim 1, wherein a computer program is configured to carry out the method.

8. The method according to claim 7, wherein the computer program is stored in a machine-readable memory medium.

* * * * *